(12) United States Patent
Olsen et al.

(10) Patent No.: US 7,849,885 B2
(45) Date of Patent: Dec. 14, 2010

(54) HOSE MEMBER

(75) Inventors: Soren B. Olsen, Flensburg (DE); Carsten Post, Aabenraa (DK)

(73) Assignee: Norsk Hydro ASA, Oslo (NO)

( * ) Notice: Subject to any disclaimer, the term of this patent is extended or adjusted under 35 U.S.C. 154(b) by 1316 days.

(21) Appl. No.: 10/535,362

(22) PCT Filed: Oct. 27, 2003

(86) PCT No.: PCT/EP03/12073

§ 371 (c)(1), (2), (4) Date: Oct. 6, 2005

(87) PCT Pub. No.: WO2004/046601

PCT Pub. Date: Jun. 3, 2004

(65) Prior Publication Data

US 2006/0151040 A1    Jul. 13, 2006

(30) Foreign Application Priority Data

Nov. 18, 2002 (NO) .................................. 20025537

(51) Int. Cl.
*F16L 11/00* (2006.01)

(52) U.S. Cl. ........................ 138/115; 138/116; 138/117; 138/109

(58) Field of Classification Search ................. 138/115, 138/116, 117, 109
See application file for complete search history.

(56) References Cited

U.S. PATENT DOCUMENTS

| | | | | | |
|---|---|---|---|---|---|
| 2,733,176 | A | * | 1/1956 | Balis | 138/109 |
| 2,832,374 | A | * | 4/1958 | November | 285/123.1 |
| 3,989,067 | A | * | 11/1976 | Gates, Jr. | 138/129 |
| 4,000,759 | A | * | 1/1977 | Higbee | 138/130 |
| 4,343,844 | A | * | 8/1982 | Thayer et al. | 428/34.9 |
| 4,897,359 | A | * | 1/1990 | Oakley et al. | 435/297.4 |
| 5,114,578 | A | * | 5/1992 | Sundstrom | 210/256 |
| 5,865,215 | A | * | 2/1999 | Freed | 138/109 |
| 5,905,834 | A | * | 5/1999 | Anderson et al. | 385/111 |
| 6,102,077 | A | * | 8/2000 | Legallais et al. | 138/115 |

FOREIGN PATENT DOCUMENTS

| | | |
|---|---|---|
| CN | 321638 | 5/1957 |
| DE | 10110706 | 9/2002 |
| GB | 838070 | 6/1960 |

* cited by examiner

*Primary Examiner*—James F Hook
(74) *Attorney, Agent, or Firm*—Hartman & Hartman, P.C.; Gary M. Hartman; Domenica N. S. Hartman

(57) ABSTRACT

A hose member having a central region surrounded by a circumferential portion comprising a number of metal tubes that are substantially parallel to each other and wound in a helical manner around a longitudinal axis of the hose member. The central region may be defined by a carrier made of a polymeric material, or a longitudinal central cavity.

22 Claims, 5 Drawing Sheets

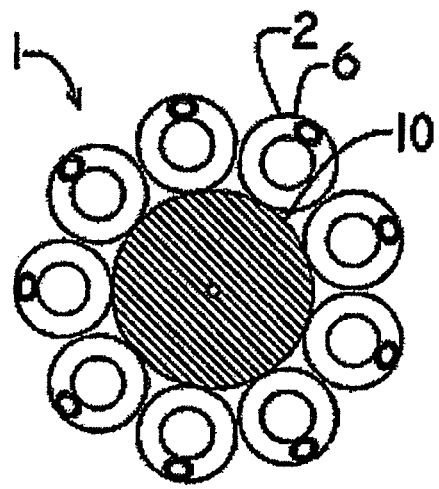
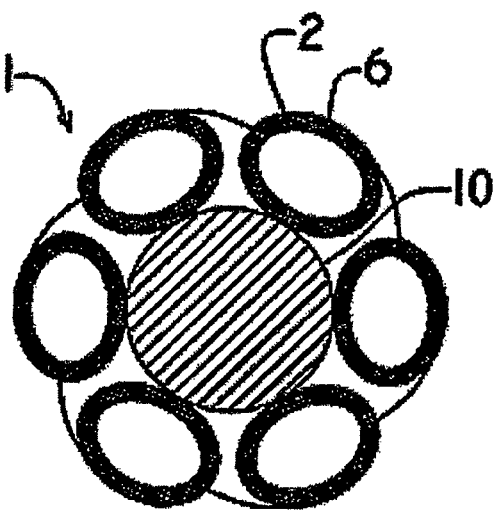
Fig. 8      Fig. 9
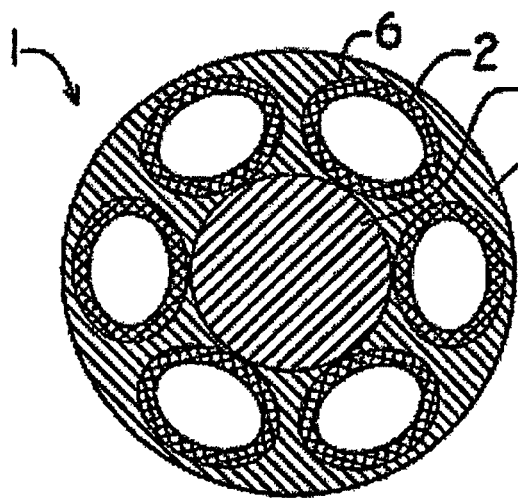
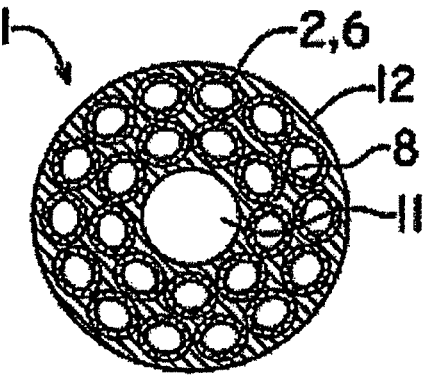
Fig. 10     Fig. 11

HOSE MEMBER

CROSS REFERENCE TO RELATED APPLICATIONS

This application claims the benefit of International Application No. PCT/EP2003/012073 FILED Oct. 27, 2003, having a priority claim to Norwegian patent application number 20025537 filed Nov. 18, 2002.

BACKGROUND OF THE INVENTION

The invention relates to a hoselike member having an external wall composed of a number of metal wires, or tubes.

Such hoselike members are generally known and are used as protective hose for guiding longitudinal objects, such as electrical cables, fluid lines, etc., especially in cars. The walls of these hoselike members are generally composed of metal wires that are woven, usually round woven, so as to form a generally continuous surface.

These known hoselike members fulfill these functions in a satisfactory way. Nevertheless, there is need for similar members with lightweight constructions and for use in other applications.

BRIEF SUMMARY OF THE INVENTION

It is, therefore, an objective of the invention to provide such a hoselike member.

This objective is achieved by ensuring that all the wires or tubes are parallel to each other and by ensuring that the wires or tubes are wound in a helical manner around the axis of the hoselike member.

In this way, a very effective and cheap method of producing hoselike members can be obtained.

Preferably, the metal is aluminium or an aluminium alloy.

By using this type of metal, which is lightweight and easy to bend, it is even possible to obtain a convenient way of producing the hoselike member.

Otherwise, and especially when using tubes, the hoselike member can be used as a flexible connection in a fluid transportation system.

Until now, it has been common to use rubber hoses for these applications, and, if provided with steel filaments, they were even capable of containing high pressures, e.g. for use in hydraulic systems. The property making the rubber hoses well suited to this purpose is their high degree of flexibility, whereby the hoses can connect fixed parts with moving parts. The hoses are also durable, even when subject to vibration. As such, they have frequently been used in automotive systems, in which two components, each having their own vibrating system, need to be connected by a fluid line, and where a certain degree of flexibility is required. Examples of such applications are air-conditioning systems, fuel supply systems, brake lines, etc.

As a material, however, rubber suffers from the drawback that at least some fluid, in gas form, may diffuse through the material. In vehicle braking systems, water enters into the brake fluid by diffusion through the flexible rubber hose connections. In air-conditioning systems, especially those based upon carbon dioxide, the carbon dioxide slowly escapes through the rubber hoses, resulting in poor performance of the systems, and time-consuming and costly refilling is necessary. A further disadvantage of rubber is aging, which normally occurs in all outdoor conditions. As a result thereof, rubber moulders away and needs replacement at time-intervals dependent upon its application. Moreover, the tensile strength of rubber is relatively low, and does not make it very suitable for high-pressure applications.

It is, therefore, an aim of the invention to provide a hoselike member having a circumference formed by a number of metal tubes, where all the tubes are substantially parallel to each other and are wound in a helical manner around the longitudinal axis of the hoselike member.

BRIEF DESCRIPTION OF THE DRAWINGS

Other characteristics and advantages of the invention will become clear from the following descriptions, which refer to the annexed drawings:

FIG. 8 shows a cross section of an example of a hoselike member corresponding to section B-B of FIG. 5.

FIG. 9-11 show cross sections of an example of a hoselike member corresponding to section A-A of FIG. 4.

DETAILED DESCRIPTION OF THE INVENTION

Figure 1:
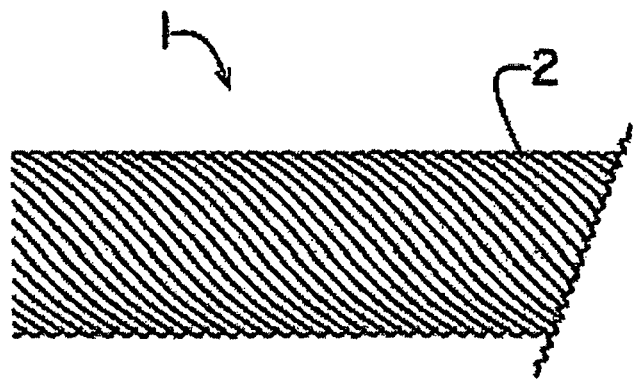
FIG. 1 shows a side view of a hoselike member corresponding to the invention.

FIG. 1 shows a hoselike member (1) comprising a number of helically wound or twisted wires or tubes (2). The hoselike member can be made by helically winding a number of wires or tubes around a core member of the required cross-sectional shape, e.g. round, oval or any useful configuration, following which the core member is removed from the resulting hoselike member. It is thus possible to either have the neighbouring wires or tubes so close together that a hoselike member with a closed surface is obtained, or to have some distance between adjacent wires or tubes and obtain a semi-closed surface offering more flexibility. The central part of the hoselike member (1) may be either hollow or filled with a core material (10) (see FIG. 6), dependent upon the application for which the hoselike member is to be used. Such a hoselike member (1) forms a flexible member which can be elastically deformed in a direction perpendicular to its longitudinal axis, i.e. it can be bent and absorb vibrations in that direction. Furthermore, a flexible deformation in the longitudinal direction is also possible.

The wires or tubes making up the hoselike members are preferably made of aluminium or aluminium alloys, which offer good deformability, flexibility and durability—useful features for the production and the application of the hoselike member.

In cases where the central part is hollow, the hoselike member can be used as a protective guide for sensitive longitudinal elements, such as electrical cables, flexible hoses, etc. This is a preferred application in automotive vehicles, but it may also be used in other situations. In such applications, each end portion of the hoselike member (1) may be covered in order to protect the ends of the wires or tubes (not shown). When this protection is required, a closed surface may be preferred, but in a number of applications, it is only the guidance that is important so that a semi-open surface can be used.

In such applications, the elements making up the hoselike member may be either wires or tubes, and, where necessary, the hoselike member may be longitudinally preformed so as to provide the required guiding of the longitudinal elements.

In other applications the hoselike member is intended to be used as a flexible fluid connection between two rigid fluid lines, or implements. In this type of application, the hoselike members must be made out of wound or twisted tubes.

Figure 2:
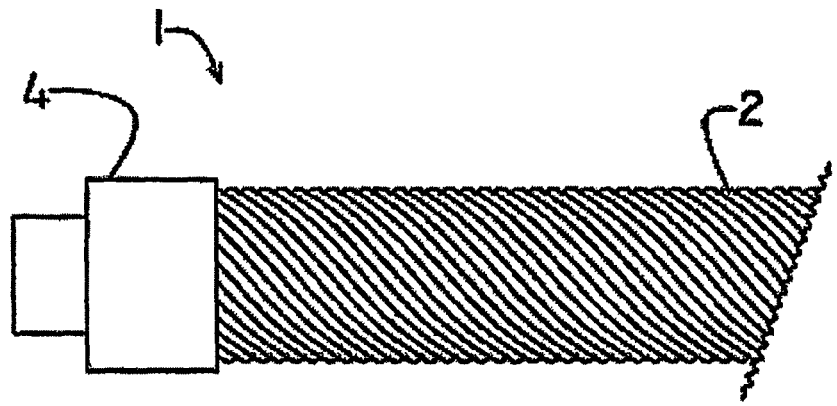
FIG. 2 shows a side view of a hoselike member in a fluid transport application.
Figure 3:
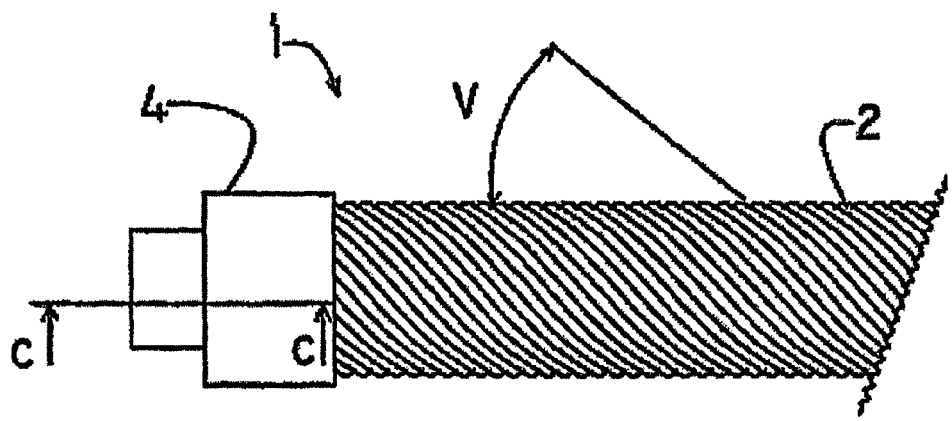
FIG. 3-5 shows a side view of other examples of a hoselike member in a fluid transport application.
Figure 4:
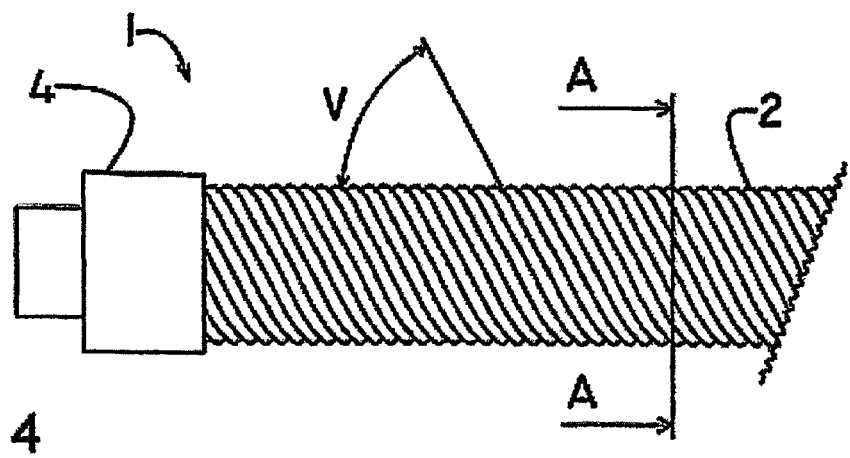
Figure 5:
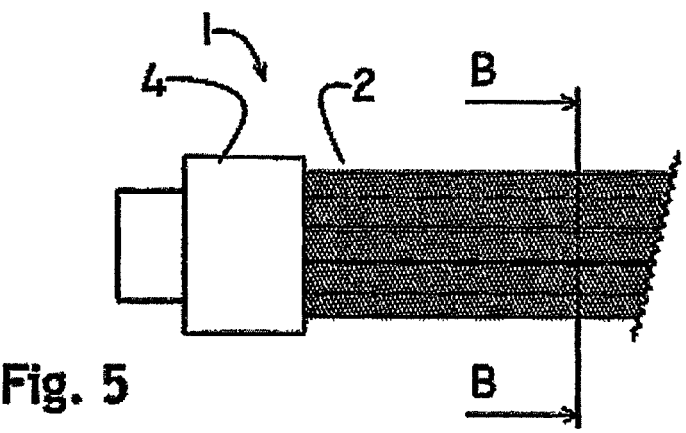

FIG. 2-5 show hoselike members (1) comprising wound or twisted tubes (2) and end pieces or manifolds (4). The end pieces (4) may be used to assemble the flow paths of the tubes to one common flow path or, conversely, to distribute one flow path into the tubes (2). In FIG. 3 and 4, the pitch angle V is shown. The pitch angle is the angle into which the tubes are wound or twisted. The tubes (2) may be wound or twisted into any shape, e.g. helical, spiral, coil, as well as given a varying pitch angle or diameter, or with combinations of any such shapes.

In FIG. 2, unwound or untwisted straight and parallel tubes (2) have initially been placed with each end into two end pieces (4) (only one is shown), with a core member (not visible) (10) placed centrally to the tubes (2). The end pieces (4) have then been twisted relative to each other and, thereby, also the tubes (2), until the tubes (2) have obtained a permanent twist and maintain the depicted shape. This is a preferred way of manufacturing the system (1). The tube (2) would normally be glued, brazed or welded to the end pieces (4) to form a tight connection. Following these processes, the system (1) may have a further polymeric protective member (12) (FIG. 10) cast around it, whereby it becomes at least partly embedded. Alternatively, the core carrier may be removed before the protective carrier (12) is added (FIG. 11).

Figure 6:
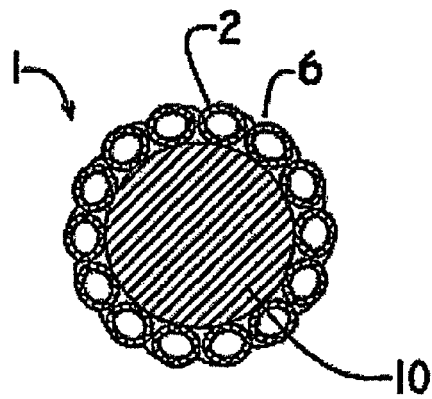
FIG. 6-7 show a cross section of an example of a hoselike member corresponding to section A-A of FIG. 4.
Figure 7:
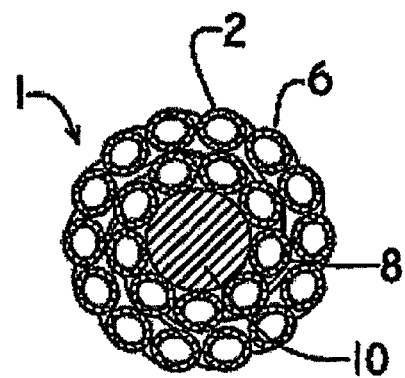

FIG. 6 and 7 display a hoselike member (1), where multiple tubes (2) are placed to surround a cylindrical carrier, which in these cases are core members (10). The core member is made of a polymeric material, preferably an elastomer such as polyurethane. In FIG. 6 the tubes are placed in one layer (6), whereas in FIG. 7 the tubes are placed in two layers (6) and (8). With more layers, a larger flow area may be obtained, thereby decreasing the flow resistance through the tube system without increasing the outer diameter of the system (1).

FIG. 8 displays a hoselike member (1), where a number of wound or twisted tubes (2) are placed at a distance from and parallel to the longitudinal axis of a core member (10) comprising a central cavity 11.

FIG. 9 displays a pipe system (1), where six tubes (2) are placed to surround a core member (10).

FIG. 10 displays a hoselike member (1), where six tubes (2) are placed to surround a core member (10). The tubes (2) are further embedded in a protective carrier (12).

FIG. 11 shows a hoselike member (1) comprising multiple tubes (2) placed in two layers (6) & (8). The tubes (2) are embedded in a protective carrier (12) comprising a central cavity (11).

FIG. (12) shows a hoselike member (1) comprising manifolds (4) and a spiral section (14) and a straight section (16). This design is well suited for applications requiring very high flexibility. Of course, the hoselike member may comprise further spiral and/or straight sections.

Figures 12, 13:
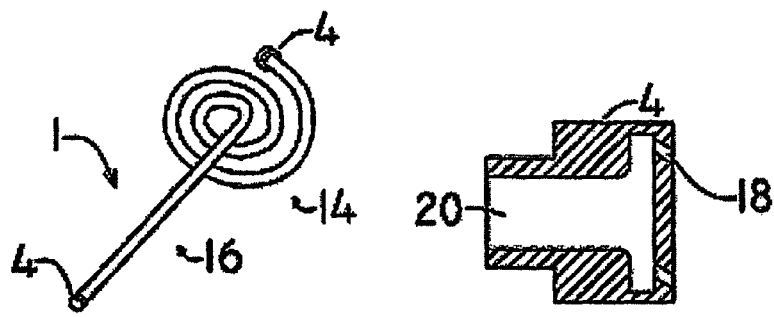
FIG. 12 shows a side view of an example of a hoselike member.
FIG. 13 shows section C-C of FIG. 3.

FIG. 13 displays a manifold (4) comprising mounting holes (18) distributed in a suitable pattern for receiving the pipes (2). The holes (18) are connected to a central opening (20).

The hoselike member (1) may be used in high pressure systems carrying gas, air, water, steam, petrochemicals or any other substance in order to allow individual movement of the equipment and the connecting lines. The member (1) may also be used in braking systems on vehicles and other means of transport. In these types of applications it may be used with or without a core carrier.

The degree of flexibility of a tube system is, according to the invention, defined by a number of characteristics of the tubes to be used.

Figure 14:
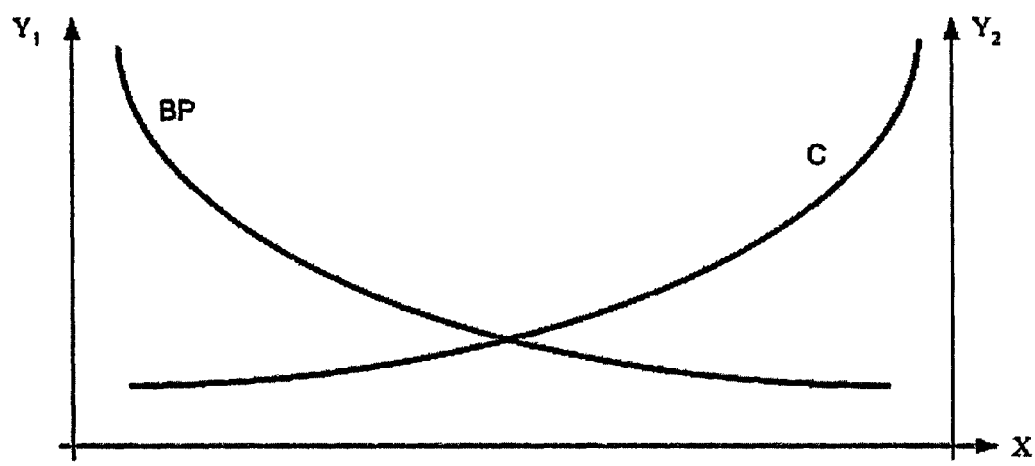
FIG. 14 is a graph showing schematically the change in compliance and strength in relation to the diameter of tubes or wires used to make the hoselike member, according to the invention.
Figure 15:
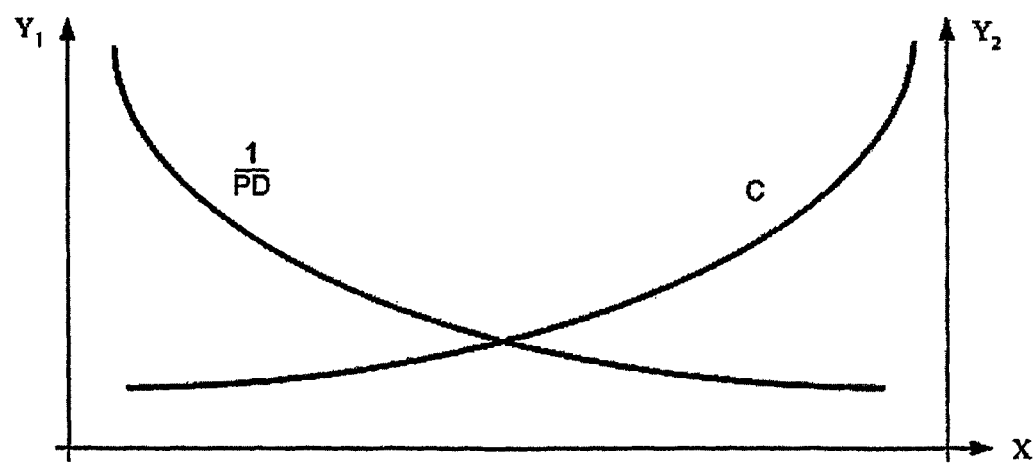
FIG. 15 is a graph showing schematically the variation in compliance, and the relation ship between pressure drop and the wall thickness of a tube or wire with fixed diameter to form the hoselike member according to the invention.

For a tube of a given material, the compliance perpendicular to the longitudinal direction is dependent upon the diameter of the tube, and the wall thickness. FIG. 14 illustrates the variation of the compliance (C) of a tube having a fixed wall thickness in relation to the diameter. It is clear that the compliance will increase as the diameter increases. Furthermore, and as shown in FIG. 15, the compliance of a tube with a constant diameter increases as the wall thickness increases.

Otherwise, the burst pressure (BP) of a tube of a defined material is dependent upon the diameter. In FIG. 14, the variation of burst pressure is shown as a function of the diameter, and it is clear that it decreases as the diameter increases. In FIG. 15, the variation of the pressure drop as a function of the wall thickness is shown, and it follows that the pressure drop increases as the wall thickness increases, the diameter being constant.

In order to make a flexible system, having sufficient compliance, sufficient mechanical strength, especially resistance to internal pressure, and the lowest possible pressure drop it is important to use tubes with a diameter and a wall thickness that provide a compromise between those requirements.

Tests have shown that the most adequate tubes will have an internal diameter between 1 and 6 mm and a wall thickness between 0.1 and 0.5 mm.

Preferably the internal diameter is between 2 and 4 mm, whereas the wall thickness is close to between 0.2 and 0.4 mm.

Figure 16:
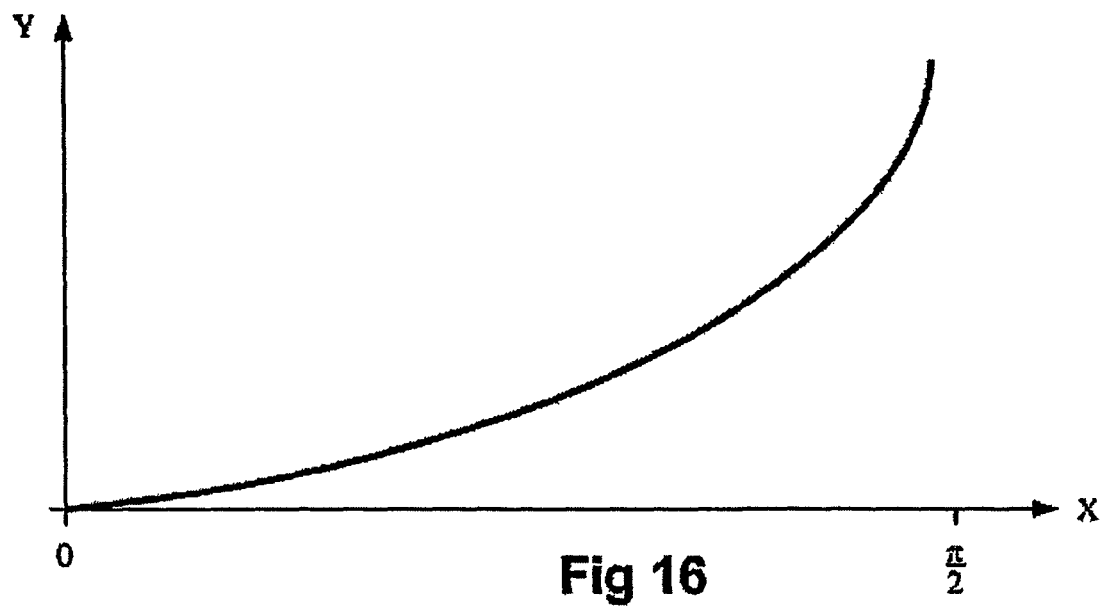
FIG. 16 is a graph showing the variation in flexibility versus the twisting angle for a hoselike member according to the invention.

Otherwise, it has been found that the degree of flexibility or compliance is dependent upon the pitch angle V, i.e. the angle between the helical wound tube and the longitudinal axis of the pipe system (see FIG. 16). Also here, there is a compromise between the pitch angle V and the mechanical strength of the system, as especially its axial strength must be sufficient to maintain the pipe system in the right position. It is, therefore, preferable to have a pitch angel V of between 50° and 85°. Ideally, the pitch angle should be between 60° and 80°.

Figure 17:
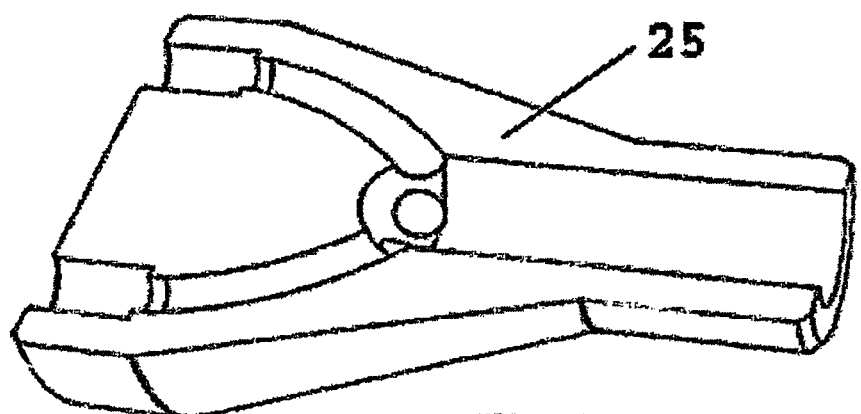
FIG. 17 is a perspective view of a modified example of the end-connector (manifold) to be used in connection with the hoselike member according to the invention.

FIG. 17 shows a manifold, or connecting piece (25), which can be used for connecting a hoselike member composed of a number of capillary tubes to a single tube.

The construction of this connecting piece is almost identical to the one described in EP-B-0 895 051.

It is to be understood that the invention as disclosed in the description and in the figures may be modified and changed and still be within the scope of the invention as claimed hereinafter.

The invention claimed is:

1. Hose member adapted for installation as a flexible connection in a fluid transportation system, the hose member having a central region surrounded by a circumferential portion that defines an outermost external surface of the hose member and surrounds and encloses the central region, the central region being defined by either a longitudinal core member or a longitudinal central cavity, the circumferential portion comprising a number of metal tubes which are substantially parallel to each other and wound in a helical manner around a longitudinal axis of the hose member, the tubes having an internal diameter of about 1 to about 6 mm and a wall thickness of about 0.1 and about 0.5 mm to provide a compromise among compliance, strength and pressure drop of the hose member for use as the flexible connection in the fluid transportation system.

2. Hose member according to claim 1, wherein each of the tubes has an internal diameter between 2 and 4 mm.

3. Hose member according to claim 1, wherein each of the tubes have a wall thickness between 0.2 and 0.4 mm.

4. Hose member according to claim 1, wherein each of the tubes has a pitch angle of about 50 to about 85 degrees.

5. Hose member according to claim 1, wherein the circumferential portion is at least partly made of more than one layer of tubes.

6. Hose member according to claim 1, wherein the tubes are at least partly embedded in a protective carrier.

7. Hose member according to claim 1, wherein each tube is coated with a protective coating.

8. Hose member according to claim 1, wherein the outermost external surface of the hose member is defined by the tubes and is a substantially closed surface.

9. Hose member according to claim 1, wherein the ends of the tubes at a first end of the hose member are all fluidically connected to a first manifold, and the ends of the tubes at an oppositely-disposed second end of the hose member are all fluidically connected to a second manifold, and the tubes define the flexible connection between the two manifolds.

10. Hose member according to claim 1, wherein the central region of the hose member is defined by the core member, and the core member comprises a carrier made of a polymeric material.

11. Hose member according to claim 1, wherein the metal tubes are formed of aluminium or an aluminium alloy.

12. Hose member according to claim 1, wherein the hose member is installed in an automotive vehicle and the tubes transport a pressurized fluid.

13. Hose member according to claim 1, wherein the central region of the hose member is defined by the longitudinal central cavity.

14. Hose member according to claim 1, wherein the fluid transportation system is a vehicle braking system and the fluid contained by the tubes is brake fluid.

15. Hose member according to claim 1, wherein the fluid transportation system is a vehicle air-conditioning system and the fluid contained by the tubes is carbon dioxide.

16. Hose member adapted for installation as a flexible connection in a fluid transportation system, the hose member comprising:
a core member coinciding with a longitudinal axis of the hose member and extending from a first end to an oppositely-disposed second end of the hose member, the core member being formed of a polymeric material; and
a circumferential portion surrounding and contacting the core member and defining an outermost external surface of the hose member that surrounds and encloses the core member, the circumferential portion comprising a plurality of tubes that are substantially parallel to each other and wound in a helical manner around the core member, the tubes having an internal diameter of about 1 to about 6 mm and a wall thickness of about 0.1 and about 0.5 mm to provide a compromise among compliance, strength and pressure drop of the hose member for use as the flexible connection in the fluid transportation system.

17. Hose member according to claim 16, wherein the core member is formed of an elastomeric material.

18. Hose member according to claim 16, wherein the hose member and the core member thereof are flexibly deformable in directions parallel to the longitudinal axis.

19. Hose member according to claim 16, wherein the tubes are embedded in a protective carrier and the tubes and protective carrier define the outermost external surface of the hose member, and the outermost external surface is a closed surface surrounding and enclosing the core member.

20. Hose member adapted for installation as a flexible connection in a fluid transportation system, the hose member comprising:
an internal cavity coinciding with a longitudinal axis of the hose member and extending from a first end to an oppositely-disposed second end of the hose member; and
a circumferential portion surrounding the internal cavity, the circumferential portion comprising a plurality of tubes embedded in a protective carrier, the tubes being substantially parallel to each other and wound in a helical manner so as to define with the protective carrier a closed outermost external surface surrounding and enclosing the internal cavity, the tubes having an internal diameter of about 1 to about 6 mm and a wall thickness of about 0.1 and about 0.5 mm to provide a compromise among compliance, strength and pressure drop of the hose member for use as the flexible connection in the fluid transportation system.

21. Hose member according to claim 20, wherein the hose member is flexibly deformable in directions parallel to the longitudinal axis.

22. Hose member according to claim 20, further comprising a longitudinal element protectively disposed within the internal cavity.

* * * * *